United States Patent
Son et al.

(10) Patent No.: US 11,613,628 B2
(45) Date of Patent: Mar. 28, 2023

(54) PRODUCTION METHOD FOR STABILIZED OLEFIN RESIN COMPOSITION

(71) Applicant: ADEKA CORPORATION, Tokyo (JP)

(72) Inventors: Changsu Son, Saitama (JP);
Tomomasa Tezuka, Saitama (JP);
Kazukiyo Nomura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/490,378

(22) PCT Filed: Feb. 28, 2018

(86) PCT No.: PCT/JP2018/007626
§ 371 (c)(1),
(2) Date: Aug. 30, 2019

(87) PCT Pub. No.: WO2018/159715
PCT Pub. Date: Sep. 7, 2018

(65) Prior Publication Data
US 2020/0010643 A1 Jan. 9, 2020

(30) Foreign Application Priority Data
Mar. 3, 2017 (JP) .............................. JP2017-040513

(51) Int. Cl.
| C08K 5/526 | (2006.01) |
| C08K 5/20  | (2006.01) |
| C08K 5/524 | (2006.01) |
| C08K 5/56  | (2006.01) |

(52) U.S. Cl.
CPC .............. *C08K 5/526* (2013.01); *C08K 5/20* (2013.01); *C08K 5/524* (2013.01); *C08K 5/56* (2013.01)

(58) Field of Classification Search
CPC .......... C08K 5/526; C08K 5/20; C08K 5/524; C08K 5/56
USPC ....................................................... 524/128
See application file for complete search history.

(56) References Cited

U.S. PATENT DOCUMENTS

| 5,278,210 A | 1/1994 | Morini et al. |
| 2008/0214752 A1 | 9/2008 | Tobita et al. |
| 2010/0048782 A1 | 2/2010 | Gelbin et al. |
| 2011/0028617 A1 | 2/2011 | Hill et al. |
| 2012/0022212 A1 | 1/2012 | Ayabe et al. |
| 2013/0237114 A1 | 9/2013 | Kawamoto et al. |
| 2014/0045981 A1 | 2/2014 | Zahalka et al. |
| 2015/0065649 A1 | 3/2015 | Kawamoto et al. |
| 2015/0152248 A1 | 6/2015 | Kawamoto et al. |

FOREIGN PATENT DOCUMENTS

| CN | 103210130 A | 7/2013 |
| CN | 104203991 A | 12/2014 |
| CN | 104419067 A | 3/2015 |
| JP | 5-271335 A | 10/1993 |
| JP | 2005-206625 A | 8/2005 |
| JP | 2005-255953 A | 9/2005 |
| JP | 2006-282985 A | 10/2006 |
| JP | 2006-282998 A | 10/2006 |
| JP | 2009-541526 A | 11/2009 |
| JP | 2010-215892 A | 9/2010 |
| JP | 2013-501092 A | 1/2013 |
| JP | 2013-256628 A | 12/2013 |
| JP | 2014-95042 A | 5/2014 |
| JP | 2014-95043 A | 5/2014 |
| JP | 2014-95044 A | 5/2014 |
| JP | 2014-95045 A | 5/2014 |
| JP | 2014-95046 A | 5/2014 |
| JP | 2017-226750 A | 12/2017 |
| WO | WO 2014/020170 A1 | 2/2014 |

OTHER PUBLICATIONS

International Search Report, issued in PCT/JP2018/007626, dated Jun. 5, 2018.
English translation of the International Preliminary Report on Patentability and Written Opinion dated Sep. 12, 2019, in PCT/JP2018/007626.
Office Action dated Mar. 18, 2021, in Chinese Patent Application No. 201880015354.X.

*Primary Examiner* — Frances Tischler
(74) *Attorney, Agent, or Firm* — Birch, Stewart, Kolasch & Birch, LLP

(57) ABSTRACT

Provided is a production method that can produce an olefin resin composition having excellent long-term stability and providing a sufficient stabilization effect to the olefin resin composition. This production method is a method of producing an olefin resin composition that contains a polyolefin resin polymerized with, an addition of a mixture of a phenolic antioxidant represented by the following Formula (1) and a phosphite compound represented by the following Formula (2) or (3), and an organoaluminum compound or a mixed solvent of an organoaluminum compound and an organic solvent, to a catalyst system or a polymerization system before or during the polymerization of the olefin monomer.

9 Claims, No Drawings

PRODUCTION METHOD FOR STABILIZED OLEFIN RESIN COMPOSITION

TECHNICAL FIELD

The present invention relates to a method of producing an olefin resin composition. More particularly, the present invention relates to a method of producing a stabilized olefin resin composition, the method including polymerizing an olefin monomer with a supply of a mixture of phenolic antioxidant, and an organoaluminum compound or a mixed solvent of an organoaluminum compound and an organic solvent.

BACKGROUND ART

Polymers have poor stability against heat and light and are thus easily oxidized/degraded when exposed to a high-temperature environment or an intense light; therefore, such polymers cannot attain a service life required for plastic products. In order to inhibit the oxidation/degradation, polymers are stabilized with an addition of a stabilizer(s), such as a phenolic antioxidant, a phosphorous-based antioxidant, a thioether-based antioxidant, a hydroxylamine compound, a hindered amine compound, an ultraviolet absorber, and/or an acid scavenger.

Particularly, phenolic antioxidants are known as additives that suppress thermal oxidation and oxidation during storage of olefin resins as well as discoloration of molded articles obtained by molding of olefin resins. Conventionally, an olefin resin is stabilized by adding thereto a variety of additives including a phenolic antioxidant and melt-kneading the resultant using processing equipment such as an extruder.

However, a method based on melt-kneading has a problem in that it exposes the resulting polymer to a high-temperature environment and causes a reduction of the molecular weight, coloration, and deterioration of the physical properties in the polymer. In addition, in order to compensate defective dispersion of a stabilizer, it is required to add the stabilizer in an amount more than necessary, which is economically disadvantageous. Accordingly, methods in which a stabilizer is added before or during polymerization of a monomer have been studied aiming at omitting the step of incorporating the stabilizer by melt-kneading of the polymer; however, phenolic antioxidants have a problem of inhibiting the catalytic activity of a polymerization catalyst.

For example, in Patent Document 1, it is described that tetrakis(3-(3,5-di-tert-butyl-4-hydroxyphenyl)propionyloxymethyl)methane, which is widely used as a stabilizer of a polyolefin, cannot be added before polymerization since it inhibits the catalytic activity of a polymerization catalyst, and a method of allowing a Ziegler catalyst supported on magnesium chloride to form a complex with an ether compound is proposed.

Moreover, in Patent Documents 2 to 11 and the like, the present inventors have proposed methods of blending an organoaluminum compound and a phenolic antioxidant, which are normally used in olefin polymerization, in an existing catalyst feed tank or polymerization vessel to mask the phenolic antioxidant and to thereby stabilize the resulting polymer without inhibiting the polymerization.

RELATED ART DOCUMENTS

Patent Documents

[Patent Document 1] JPH05-271335A
[Patent Document 2] JP2005-206625A
[Patent Document 3] JP2005-255953A
[Patent Document 4] JP2006-282985A
[Patent Document 5] JP2010-215892A
[Patent Document 6] JP2013-256628A
[Patent Document 7] JP2014-095042A
[Patent Document 8] JP2014-095043A
[Patent Document 9] JP2014-095044A
[Patent Document 10] JP2014-095045A
[Patent Document 11] JP2014-095046A

SUMMARY OF THE INVENTION

Problems to be Solved by the Invention

However, since the treatment of the catalyst is complicated in the method described in Patent Document 1, there is a demand for a polymer stabilization method that is simpler and easier and does not restrict the catalytic action. In addition, the production methods according to Patent Documents 2 to 11 have a problem of consuming an antioxidant component to cause deterioration of the resulting olefin resin to progress when the olefin resin is exposed to heat, oxygen or light over a long period, and these production methods thus do not provide a sufficient stabilization effect.

In view of the above, an object of the present invention is to provide a production method that can provide a sufficient stabilization effect and produce an olefin resin composition having excellent long-term stability.

Means for Solving the Problems

The present inventors, as a result of intensively studying to solve the above-described problems, provide a production method including the step of polymerizing an olefin monomer with an addition of a specific phenolic antioxidant and a specific phosphite compound, which are contained in an organoaluminum compound or a mixed solvent of an organoaluminum compound and an organic solvent, before or during the polymerization of the olefin monomer.

That is, a production method of the present invention is a method of producing an olefin resin composition that comprises a polyolefin resin polymerized with an addition of a mixture of: a phenolic antioxidant represented by the following Formula (1) and a phosphite compound represented by the following Formula (2) or (3); and an organoaluminum compound or a mixed solvent of an organoaluminum compound and an organic solvent, to a catalyst system or a polymerization system before or during the polymerization of the olefin monomer:

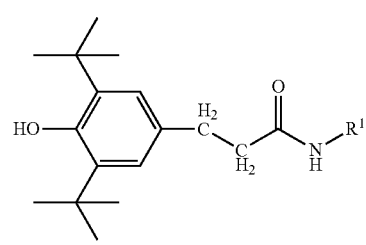

(1)

(wherein, $R^1$ represents a linear or branched alkyl group having 1 to 30 carbon atoms);

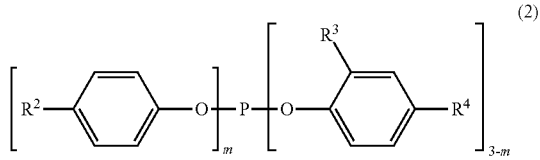

(wherein, $R^2$, $R^3$ and $R^4$ each independently represent an alkyl group having 1 to 8 carbon atoms; and m represents a number of 0 to 3); and

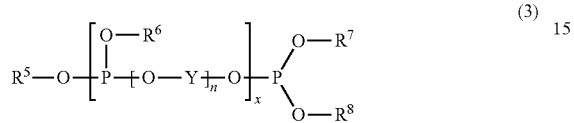

(wherein, $R^5$, $R^6$, $R^7$ and $R^8$ each independently represent an alkyl group having 1 to 20 carbon atoms, or Y—OH; Y represents one selected from an alkylene having 2 to 40 carbon atoms, an alkyl lactone having 2 to 40 carbon atoms, and —$R^9$—N($R^{10}$)—$R^{11}$—; $R^9$, $R^{10}$ and $R^{11}$ each independently have the same meaning as defined for $R^5$, $R^6$, $R^7$ and $R^8$, or represent a hydrogen atom; n represents an integer of 2 to 100; and x represents an integer of 1 to 1,000), wherein 0.001 to 5 parts by mass of the phenolic antioxidant represented by Formula (1) and 0.001 to 3 parts by mass of the phosphite compound represented by Formula (2) or (3) are incorporated with respect to 100 parts by mass of an olefin resin obtained by the polymerization.

In the production method of the present invention, it is preferred that the olefin monomer contain ethylene or propylene.

In the production method of the present invention, it is also preferred that $R^1$ in Formula (1) be an alkyl group having 12 to 24 carbon atoms.

Further, in the production method of the present invention, it is preferred that the organoaluminum compound be a trialkyl aluminum.

An olefin polymer of the present invention is an olefin polymer obtained by the production method of the present invention.

An olefin resin composition of the present invention is characterized in that it is produced by the production method of the present invention.

A molded article of the present invention is characterized in that it is obtained by molding the olefin resin composition of the present invention.

Effects of the Invention

According to the production method of the present invention, an olefin resin composition capable of maintaining excellent stabilization effect over a long period can be provided.

MODE FOR CARRYING OUT THE INVENTION

The production method of the present invention is characterized by the step of polymerizing an olefin monomer and, as other steps such as preparing a catalyst, supplying the monomer as a raw material and recovering the resulting polymer, those methods that are known in olefin polymerization can be employed. The present invention will now be described in detail.

A production method of the present invention includes steps of: before or during polymerization of an olefin monomer, mixing a phenolic antioxidant represented by the following Formula (1) and a phosphite compound represented by the following formula (2) or (3) with an organoaluminum compound or a mixed solvent of an organoaluminum compound and an organic solvent:

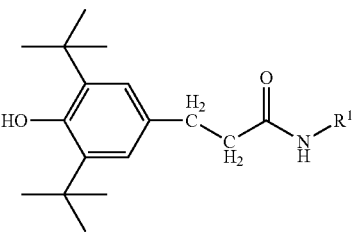

(wherein, $R^1$ represents a linear or branched alkyl group having 1 to 30 carbon atoms);

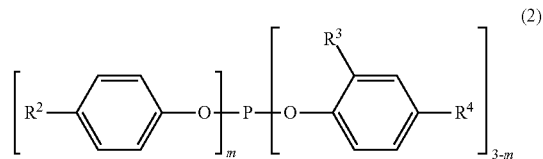

(wherein, $R^2$, $R^3$ and $R^4$ each independently represent an alkyl group having 1 to 8 carbon atoms; and m represents a number of 0 to 3); and

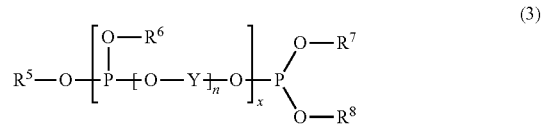

(wherein, $R^5$, $R^6$, $R^7$ and $R^8$ each independently represent an alkyl group having 1 to 20 carbon atoms, or Y—OH; Y represents one selected from an alkylene having 2 to 40 carbon atoms, an alkyl lactone having 2 to 40 carbon atoms, and —$R^9$—N($R^{10}$)—$R^{11}$—; $R^9$, $R^{10}$ and $R^{11}$ each independently have the same meaning as defined for $R^5$, $R^6$, $R^7$ and $R^8$, or represent a hydrogen atom; n represents an integer of 2 to 100; and x represents an integer of 1 to 1,000); and adding the resulting mixture to at least one spot of a catalyst system, a polymerization system and a piping so as to polymerize the olefin monomer.

The phenolic antioxidant and phosphite compound may each be added separately, or may be mixed in advance before being added.

Unless otherwise specified, the term "alkyl group" used herein refers to a monovalent saturated noncyclic hydrocarbon group that is linear or branched, and examples thereof include methyl, ethyl, propyl, isopropyl, butyl, sec-butyl, tert-butyl, isobutyl, pentyl, isopentyl, t-pentyl, hexyl, heptyl, n-octyl, isooctyl, tert-octyl, nonyl, isononyl, decyl, undecyl, dodecyl, tridecyl, tetradecyl, pentadecyl, hexadecyl, heptadecyl, octadecyl, and icosyl. The alkyl group may optionally have a substituent selected from an amino group, a halogen atom, a hydroxy group, a haloalkyl group and an alkoxy group, and the carbon chain of the alkyl may be interrupted by oxygen, sulfur or nitrogen.

As the alkyl group having 1 to 30 carbon atoms that is represented by $R^1$ in Formula (1), an alkyl group having 12 to 24 carbon atoms is particularly preferred. A phenolic antioxidant wherein the number of the carbon atoms of the alkyl group is less than 12 may be easily volatilized, whereas when the number of the carbon atoms of the alkyl group is greater than 24, the stabilization effect may be deteriorated due to a reduction in the ratio of phenol with respect to the molecular weight of the phenolic antioxidant.

Examples of a specific structure of the phenolic antioxidant represented by Formula (1) include the following compounds. It is noted here, however, that the present invention is not restricted by the following compounds:

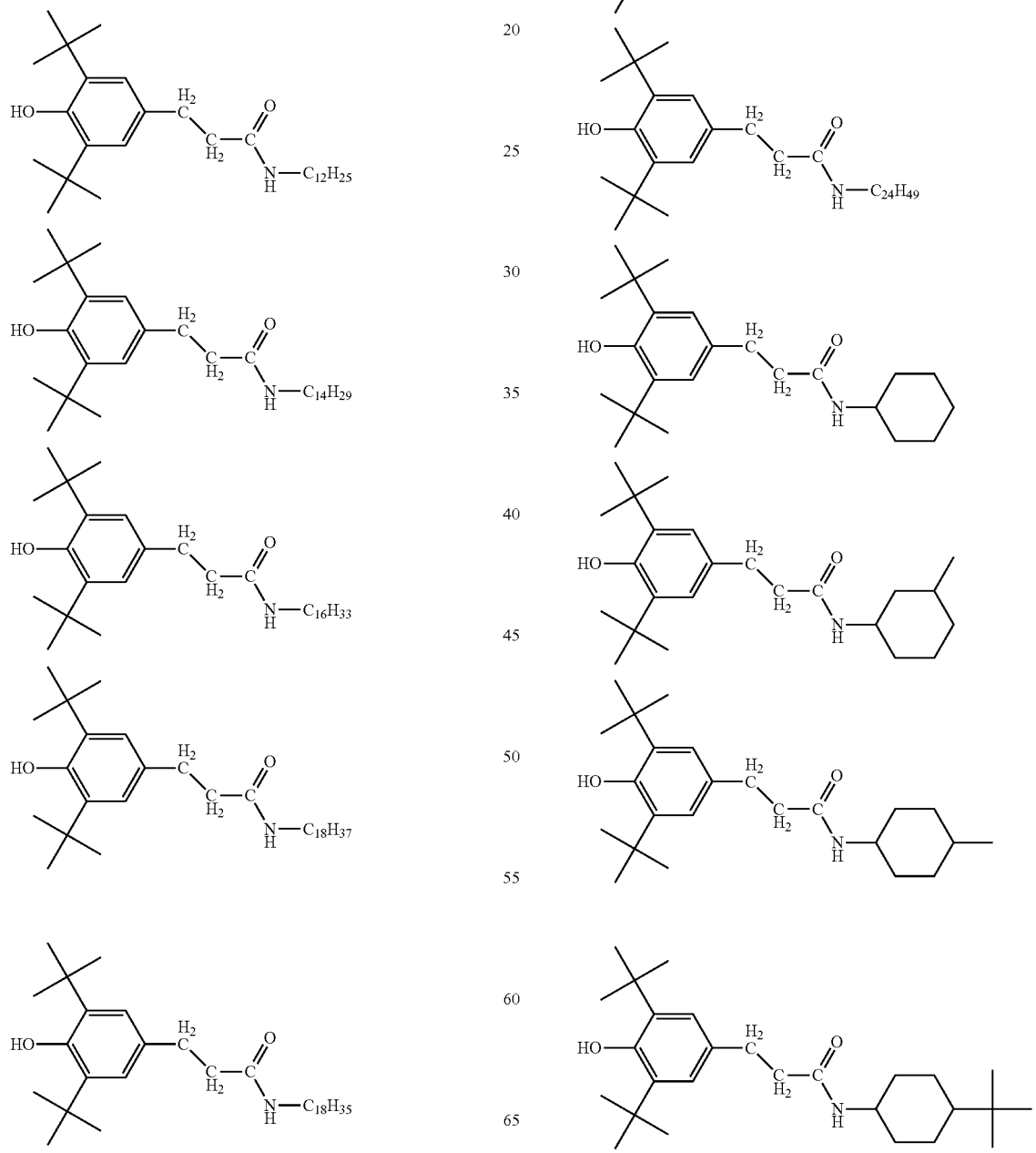

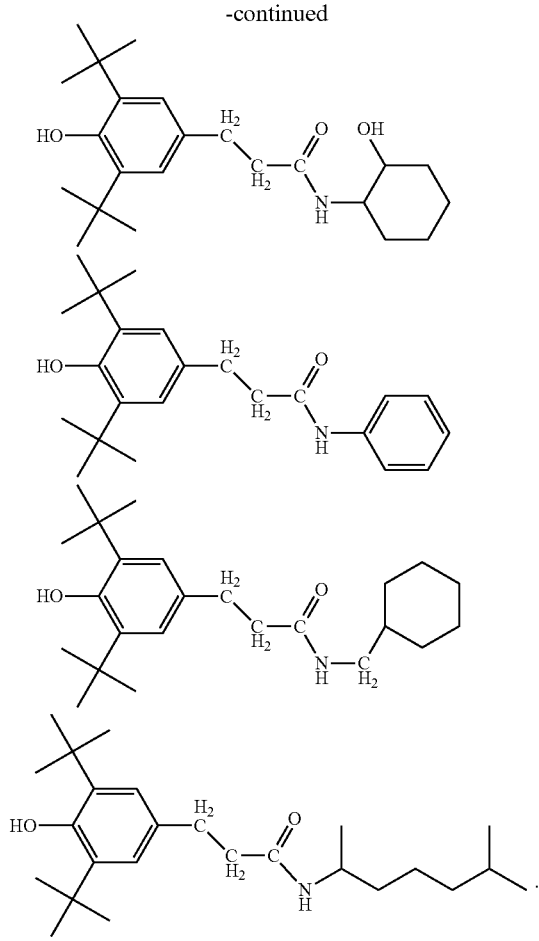

In the production method of the present invention, the phenolic antioxidant represented by Formula (1) is added in an amount of preferably 0.001 to 0.5 parts by mass, more preferably 0.005 to 0.3 parts by mass, with respect to 100 parts by mass of an olefin resin obtained by the polymerization of an olefin monomer.

When the phenolic antioxidant represented by Formula (1) is added before or during the polymerization of the olefin monomer, the phenolic antioxidant is required to have been mixed in advance with an organoaluminum compound, or a mixed solvent of an organoaluminum compound and an organic solvent.

The organoaluminum compound is, for example, an alkyl aluminum or an alkyl aluminum hydride, preferably an alkyl aluminum, particularly preferably a trialkyl aluminum. Examples of the trialkyl aluminum include trimethyl aluminum, triethyl aluminum, tri-n-propyl aluminum, triisobutyl aluminum, tri-n-hexyl aluminum and tri-n-octyl aluminum, and these compounds may be used individually, or in combination in the form of a mixture. In addition, an aluminoxane obtained by a reaction between an alkyl aluminum or an alkyl aluminum hydride and water can also be used in the same manner.

Further, as other organoaluminum compound, ethylene aluminum sesquichloride, diethyl aluminum chloride, ethyl aluminum dichloride, and/or isobutyl aluminum dichloride may be used as well. When other organoaluminum compound is used, the amount thereof is 10 equivalents or less, preferably 7 equivalents or less, with respect to 1 equivalent of the organoaluminum compound selected from an alkyl aluminum, an alkyl aluminum hydride and the like.

The mixing ratio of the phenolic antioxidant and the organoaluminum compound is preferably in a range of 1/1,000 to 1/0.3 in terms of the molar ratio of the phenolic antioxidant and the aluminum component of the organoaluminum compound. When the mixing ratio of the phenolic antioxidant is higher than 1/0.3, the polymerization activity may be adversely affected, whereas when the mixing ratio of the phenolic antioxidant is lower than 1/1,000, since the organoaluminum compound remains in the resulting olefin polymer after the polymerization and this may deteriorate the physical properties of the olefin polymer and affect a catalyst metal component, the polymerization cannot be desirably performed in some cases.

The above-described organic solvent may be, for example, an aliphatic hydrocarbon compound or an aromatic hydrocarbon compound. Examples of the aliphatic hydrocarbon compound include saturated hydrocarbon compounds, such as n-pentane, n-hexane, n-heptane, n-octane, isooctane and refined kerosene; and cyclic saturated hydrocarbon compounds, such as cyclopentane, cyclohexane and cycloheptane, and examples of the aromatic hydrocarbon compound include benzene, toluene, ethylbenzene, and xylene. Further, a mineral oil, a hydrocarbon-based wax and the like can be used as well. These organic solvents may be used individually, or two or more thereof may be used in combination.

Among the organic solvents, n-hexane, n-heptane, a gasoline fraction or a mineral oil is preferably used. The concentration of the organoaluminum compound in the organic solvent is in a range of preferably 0.001 to 0.5 mol/L, more preferably 0.01 to 0.1 mol/L.

The phenolic antioxidant and the organoaluminum compound are brought into contact with each other, whereby the hydroxy group(s) of the phenolic antioxidant is/are masked with the organoaluminum compound. This reaction is promptly completed by dissolution of the phenolic antioxidant in the organoaluminum compound and, when this reaction yields a by-product, it is desired to remove the by-product by vacuum distillation or the like. The phenolic antioxidant can be used as is when it does not affect the polymerization reaction or the resulting polymer in the production method of the present invention. Further, since the organoaluminum compound separately exists in the polymerization system, the phenolic antioxidant may be in the form of slurry at the time of being added to the catalyst system or the polymerization system.

A method of adding the mixture obtained by mixing the organoaluminum compound or a mixed solvent of the organoaluminum compound and an organic solvent with the phenolic antioxidant represented by Formula (1) is not particularly restricted and, for example, the mixture can be added to any of the polymerization system, the catalyst system and the piping. As a preferred mode, for example, the phenolic antioxidant that has been dissolved is added to a catalyst feed tank, a polymerization vessel or a production line and then mixed. As other steps such as the catalyst preparation step, the catalyst addition step, the step of supplying a raw material monomer, the monomer polymerization step and the polymer recovery step, those steps that are known in an olefin monomer polymerization method can be employed.

Moreover, the organoaluminum compound or the mixed solvent of the organoaluminum compound and the organic solvent, and the phenolic antioxidant are preferably mixed in advance before being added to the catalyst system or the polymerization system; however, the organoaluminum compound or the mixed solvent of the organoaluminum compound and the organic solvent, and the phenolic antioxidant may be separately added as well.

The phosphite compound will now be described.

Examples of the alkyl group having 1 to 8 carbon atoms that is represented by $R^2$, $R^3$ and $R^4$ in Formula (2) include the above-exemplified alkyl groups whose number of carbon atoms is within a range of 1 to 8.

Examples of a specific structure of the phosphite compound represented by Formula (2) include the following compounds. It is noted here, however, that the present invention is not restricted by the following compounds:

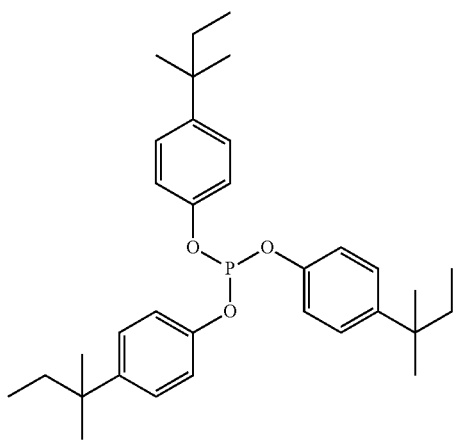

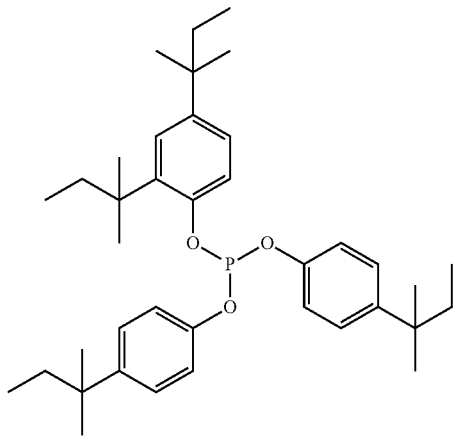

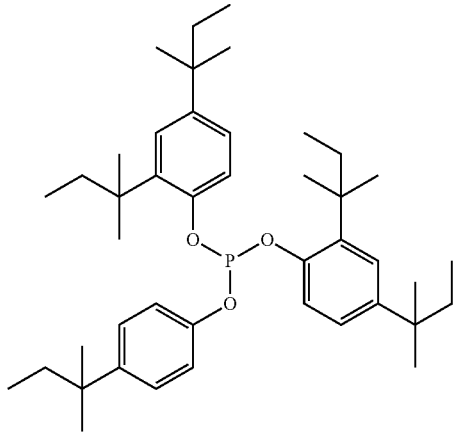

-continued

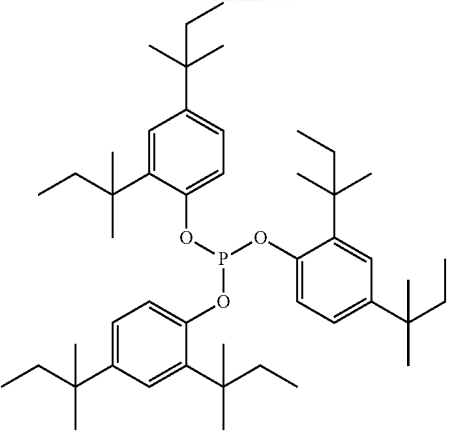

Examples of the alkyl group having 1 to 20 carbon atoms that is represented by $R^5$, $R^6$, $R^7$ and $R^8$ in Formula (3) include the above-exemplified alkyl groups whose number of carbon atoms is within a range of 1 to 20.

Examples of the alkylene having 2 to 40 carbon atoms that is represented by Y in Formula (3) include linear or branched alkylenes. Examples of the linear alkylenes include —$(CH_2)_{2\ to\ 40}$—. Examples of the branched alkylenes include 1-methylmethane-1,1-diyl, 1-ethylmethane-1,1-diyl, 1-propylmethane-1,1-diyl, 1-methylethane-1,2-diyl, 1-ethylethane-1,2-diyl, 1-propylethane-1,2-diyl, 1-methylpropane-1,3-diyl, 1-ethylpropane-1,3-diyl, 1-propylpropane-1,3-diyl, 2-methylpropane-1,3-diyl, 2-ethylpropane-1,3-diyl, 2-propylpropane-1,3-diyl, 1-methylbutane-1,4-diyl, 1-ethylbutane-1,4-diyl, 1-propylbutane-1,4-diyl, 2-methylbutane-1,4-diyl, 2-ethylbutane-1,4-diyl, 2-propylbutane-1,4-diyl, 1-methylpentane-1,5-diyl, 1-ethylpentane-1,5-diyl, 1-propylpentane-1,5-diyl, 2-methylpentane-1,5-diyl, 2-ethylpentane-1,5-diyl, 2-propylpentane-1,5-diyl, 3-methylpentane-1,5-diyl, 3-ethylpentane-1,5-diyl, 3-propylpentane-1,5-diyl, 1-methylhexane-1,6-diyl, 1-ethylhexane-1,6-diyl, 2-methylhexane-1,6-diyl, 2-ethylhexane-1,6-diyl, 3-methylhexane-1,6-diyl, 3-ethylhexane-1,6-diyl, 1-methylheptane-1,7-diyl, 2-methylheptane-1,7-diyl, 3-methylheptane-1,7-diyl, 4-methylheptane-1,7-diyl, 1-phenylmethane-1,1-diyl, 1-phenylethane-1,2-diyl, and 1-phenylpropane-1,3-diyl.

Examples of the alkyl lactone having 2 to 40 carbon atoms that is represented by Y in Formula (3) include β-butyrolactone, γ-butyrolactone, γ-valerolactone, δ-valerolactone, δ-caprolactone, and ε-caprolactone.

The phosphite compound represented by Formula (3) can be produced by allowing an alcohol compound, which is selected from triphenyl phosphite, an alkyl alcohol, an alkenyl alcohol, a glycol ether and a mixture composed of a combination thereof, to react with a high-molecular-weight diol.

The structure of the phosphite compound represented by Formula (3) is dependent on the reaction conditions, for example, the temperature; the order of adding the reaction substances; the molar ratio and the concentrations of the alcohol compound to be used, which is selected from triphenyl phosphite, an alkyl alcohol, an alkenyl alcohol, a glycol ether and a mixture composed of a combination thereof, and the high-molecular-weight diol to be used; and the molecular weight of the high-molecular-weight diol to be selected.

The alkyl alcohol is preferably an alkyl alcohol having 12 to 18 carbon atoms. The alkenyl alcohol is preferably an alkenyl alcohol having 15 to 18 carbon atoms. Preferred examples of the glycol ether include a polyethylene glycol monomethyl ether (molecular weight=350) and tripropylene glycol monobutyl ether.

Examples of the high-molecular-weight diol include those that are commercially available as polyglycol, and the high-molecular-weight diol is particularly preferably a polyethylene or a polypropylene glycol, which has a molecular weight in a range of 200 to 3,000 and is liquid at normal temperature. More preferred examples of the high-molecular-weight diol include polyethylene glycols having a molecular weight of 300 to 400, and polypropylene glycols having a molecular weight of 300 to 1,000.

In the production method of the present invention, in cases where the phosphite compound represented by Formula (2) or (3) is added in the polymerization step, the phosphite compound may be mixed in advance together with the phenolic antioxidant represented by Formula (1) and the organoaluminum compound or the mixed solvent of the organoaluminum compound and the organic solvent; the phosphite compound may be mixed after mixing the phenolic antioxidant and the organoaluminum compound or the mixed solvent of the organoaluminum compound and the organic solvent; or the phosphite compound may be mixed with the organoaluminum compound or the mixed solvent of the organoaluminum compound and the organic solvent, separately from the phenolic antioxidant. As for the place of adding the phosphite compound, the phosphite compound may be added to the polymerization system, the catalyst system, or the piping.

In the production method of the present invention, the phosphite compound represented by Formula (2) or (3) is added in an amount of preferably 0.001 to 3 parts by mass, more preferably 0.005 to 0.3 parts by mass, with respect to 100 parts by mass of an olefin resin obtained by the polymerization of an olefin monomer.

Examples of the olefin monomer used in the production method of the present invention include ethylene, propylene, 1-butene, 1-hexene, 3-methyl-1-butene, 3-methyl-1-pentene, 4-methyl-1-pentene, vinylcycloalkane, and derivatives of these monomers.

Within a range that does not impair the effects of the present invention, a monomer, for example, a conjugated diene such as 1,3-butadiene or 2-methyl-1,3-butadiene; a non-conjugated diene such as 1,4-pentadiene or 1,5-hexadiene; an unsaturated carboxylic acid such as acrylic acid or methacrylic acid; an unsaturated carboxylate, such as methyl acrylate, ethyl acrylate, butyl acrylate, methyl methacrylate or ethyl methacrylate; or a vinyl ester compound such as vinyl acetate, can be copolymerized with ethylene or an α-olefin monomer.

The olefin polymer according to the present invention is obtained by homopolymerization of the olefin monomer or copolymerization including the olefin monomer, and examples of the olefin polymer include polypropylenes, such as propylene homopolymers, ethylene-propylene copolymers, copolymers of propylene and an α-olefin(s) other than propylene (e.g., ethylene-propylene-butene copolymers); polyethylenes such as high-density polyethylenes; and cycloolefins.

In the present invention, the density of the polymer is preferably 0.890 to 0.970 g/cm$^3$, more preferably 0.900 to 0.940 g/cm$^3$. As for the average molecular weight, the polymer preferably has a weight-average molecular weight in a range of 10,000 to 7,000,000.

The polymerization of the olefin monomer can be performed in the presence of a polymerization catalyst under an inert gas atmosphere such as nitrogen, or may be performed in the organic solvent. Further, an active hydrogen compound, a particulate carrier, an ion-exchangeable layered compound and/or an inorganic silicate may be added within a range that does not inhibit the polymerization.

The polymerization catalyst is not particularly restricted, and any known polymerization catalyst can be used. Examples thereof include compounds of transition metals belonging to Groups 3 to 11 of the periodic table (e.g., titanium, zirconium, hafnium, vanadium, iron, nickel, lead, platinum, yttrium, and samarium), and representative examples of a polymerization catalyst that can be used include Ziegler catalysts; Ziegler-Natta catalysts composed of a titanium-containing solid transition metal component and an organic metal component; metallocene catalysts composed of a transition metal compound belonging to any of Groups 4 to 6 of the periodic table, which has at least one cyclopentadienyl skeleton, and a co-catalyst component; and chrome-based catalysts.

Examples of a method of polymerizing the olefin monomer include a slurry polymerization method in which polymerization is performed in an inert solvent such as an aliphatic hydrocarbon (e.g., butane, pentane, hexane, heptane, or isooctane), an alicyclic hydrocarbon (e.g., cyclopentane, cyclohexane, or methylcyclohexane), an aromatic hydrocarbon (e.g. toluene, xylene, or ethylbenzene), a gasoline fraction, or a hydrogenated diesel fraction; a gas-phase polymerization method in which polymerization is performed in a gas phase; a bulk polymerization method in which the olefin monomer itself is used as a solvent; a solution polymerization method in which a polymer is generated in a liquid form; a polymerization method which combines these methods; a method of producing an olefin homopolymer by polymerizing the olefin monomer in a single step or multiple steps; and a polymerization method in which a copolymer is produced by copolymerizing propylene with at least one olefin (excluding propylene) unit selected from the group consisting of olefin units having 2 to 12 carbon atoms. These production methods may be carried out in a batchwise manner or a continuous manner.

In the present invention, a conventional polymerization equipment for a bulk polymerization method, a gas-phase polymerization method or a combination of these methods can be adopted as is; therefore, such a polymerization equipment is preferably used, and a continuous-type polymerization equipment is industrially advantageous and thus preferred. The present invention can also be applied to a slurry polymerization method, a solution polymerization method and the like; however, since these polymerization methods require the step of drying the resulting olefin polymer, they are not preferred from the standpoint of labor saving.

In the production method of the present invention, the olefin polymer obtained in the above-described manner can be melt-kneaded while injecting a nitrogen gas containing water or a proton-donating substance, or steam into an extruder. It is believed that this allows the phenolic antioxidant masked with the organoaluminum compound or with the mixed solvent of the organoaluminum compound and the organic solvent to be regenerated.

In the production method of the present invention, in cases where a nitrogen gas containing water or a proton-donating substance is used, the nitrogen gas contains water at a volume ratio of preferably $1.0 \times 10^{-6}$ to $2.5 \times 10^{-2}$, more preferably $1.0 \times 10^{-3}$ to $1.5 \times 10^{-2}$, with respect to 1 volume of nitrogen. When the volume ratio is less than $1.0 \times 10^{-6}$ with respect to 1 volume of nitrogen, regeneration of a nucleator takes a long time, whereas when the ratio is higher than 2.5×10⁻², the water content of the resulting olefin polymer is increased and foam may be generated during molding.

In cases where the step of bringing a nitrogen gas containing water or a proton-donating substance, or steam into contact with an olefin polymer obtained in the above-described manner is applied to a continuous-type production method, an equipment in which the nitrogen gas or steam can be brought into contact with the olefin polymer in a vessel where the olefin polymer is intermittently or continuously supplied may be employed. The equipment may be of any type as long as it is capable of discharging an olefin polymer containing a regenerated nucleator, for example, a type in which the olefin polymer is supplied intermittently or continuously from an upper part of a cylindrical column and the nitrogen gas or steam is supplied from a bottom part of the column, or a type in which the olefin polymer is supplied from an upper part of a vessel and the nitrogen gas is supplied from a lower part of the vessel. Specific examples of the vessel include purge columns and steamers.

Examples of the proton-donating substance include alcohols, such as methanol, ethanol, 1-propanol, 2-propanol, n-butanol, isobutanol, sec-butanol, tert-butanol, ethylene glycol, and glycerol; phenolic substances; and mineral acids, such as hydrochloric acid and sulfuric acid; however, in the present invention, methanol or ethanol is preferably used.

In the method of producing an olefin resin composition which is characterized by including the step of injecting a nitrogen gas containing water or a proton-donating substance, or steam into an extruder at the time of melt-kneading an olefin polymer obtained in the above-described manner using the extruder, by bringing the nitrogen gas containing water or a proton-donating substance, or steam into contact with the olefin polymer at the time of melt-kneading the olefin polymer, a nucleator component contained in the olefin polymer can be regenerated. It is particularly preferred to install an extruder for mixing the olefin polymer with other additive(s) as required and melt-kneading the resultant and to introduce a nitrogen gas containing water or a proton-donating substance, or steam into the extruder, since this does not require any new equipment investment.

The extruder can be used regardless of the extrusion method such as uniaxial, biaxial or multiaxial extrusion, and it may be any extruder as long as it is capable of melting and kneading an olefin polymer and steam can be introduced thereto.

In the method of producing an olefin resin composition according to the present invention, it is preferred that the water content of the resulting olefin resin composition be in a range of 0.1 to 5 parts by mass with respect to 100 parts by mass of the olefin polymer.

When the water content is less than 0.1 parts by mass with respect to 100 parts by mass of the olefin polymer, the nucleator regeneration may be insufficient, whereas when the water content is higher than 5 parts by mass, foam may be generated during molding of the olefin resin composition, and the outer appearance of the resulting molded article may thus be deteriorated.

In the present invention, at the time of polymerizing the olefin monomer, other additive(s) normally used in an olefin resin can be further added as required within a range that does not adversely affect the polymerization. In cases where such other additive(s) is/are added at the time of polymerizing the olefin monomer, the additive(s) may be mixed and stirred with a nucleator and an organoaluminum compound. Alternatively, a method in which the additive(s) is/are supplied after being mixed with a solvent and thereby made into a suspended state (slurry formation) may be employed. The solvent is not particularly restricted, and examples thereof include the same ones as those exemplified above. The additive(s) may also be blended after the polymerization.

In the reaction performed by this method, the additive(s) may be used as is when a compound produced as a by-product does not affect the resulting polymer; however, when the by-product compound adversely affects the polymer, it is preferred to remove this compound by vacuum distillation or the like before using the additive(s).

Further, even if a direct addition of other additive(s) adversely affects the polymerization, as long as the effect on the polymerization can be suppressed by masking the additive(s) with an organoaluminum compound, such additive(s) can be used in the method of producing an olefin resin composition according to the present invention.

As the above-described other additive(s), for example, a phenolic antioxidant different from one represented by Formula (1), a phosphorus-based antioxidant different from one represented by Formula (2) or (3), a thioether-based antioxidant, an ultraviolet absorber, a hindered amine compound, a nucleating agent, a flame retardant, a flame retardant aid, a lubricant, a hydrotalcite, a fatty acid metal salt, an antistatic agent, a pigment, a fluorescent brightener, and/or a dye may be incorporated as well.

Examples of the phenolic antioxidant different from one represented by Formula (1) include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl)propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N'-hexane-1,6-diyl-bis[3-(3,5-di-tert-butyl-4-hydroxyphenyl)propionamide, 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6-di-tert-butylphenol), esters of 3,5-di-tert-butyl-4-hydroxybenzenepropanoic acid and a C13-15 alkyl, 2,5-di-tert-amylhydroquinone, hindered phenol polymer (AO.OH.98 (trade name), manufactured by ADEKA Palmarole), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl) propionate, calcium bis[monoethyl(3,5-di-tert-butyl-4-hydroxybenzyl)phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, bis[3,3-bis(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tertbutyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-tert-butyl-4'-hydroxyphenyl)propionate] methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, and triethylene glycol-bis[β-(3-tert-butyl-4-hydroxy-5-methylphenyl)propionate]. When a phenolic antioxidant is incorporated, the amount thereof is preferably 0.001 to 5 parts by mass, more preferably 0.03 to 3 parts by mass, with respect to 100 parts by mass of the olefin polymer.

Examples of the phosphorus-based antioxidant different from one represented by Formula (2) or (3) include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, dioleyl hydrogen phosphite, trilauryl trithiophosphite, bis(tridecyl) phosphite, tris(isodecyl)phosphite, tris(tridecyl)phosphite, diphenyldecyl phosphite, dinonylphenyl-bis(nonylphenyl) phosphite, poly(dipropylene glycol)phenyl phosphite, tetraphenyl dipropylene glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, a mixture of distearyl pentaerythritol and calcium stearate, alkyl(C10) bisphenol-A phosphite, tetraphenyl-tetra(tridecyl)pentaerythritol tetraphosphite, bis(2,4-di-tert-butyl-6-methylphenyl)ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propenyl-3-ylidene)-tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, bis(diisodecyl)pentaerythritol diphosphite, bis(tridecyl)pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis(2,4,6-tri-tert-butylphenyl)pentaerythritol diphosphite, bis(2,6-di-tert-butyl-4-methylphenyl)pentaerythritol diphosphite, and bis(2,4-dicumylphenyl)pentaerythritol diphosphite. When a phosphorus-based antioxidant is incorporated, the amount thereof is preferably 0.001 to 10 parts by mass, more preferably 0.01 to 0.5 parts by mass, with respect to 100 parts by mass of the olefin polymer.

Examples of the thioether-based antioxidant include tetrakis[methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), and distearyl disulfide. When a thioether-based antioxidant is incorporated, the amount thereof is preferably 0.001 to 10 parts by mass, more preferably 0.01 to 0.5 parts by mass, with respect to 100 parts by mass of the olefin polymer.

Examples of the ultraviolet absorber include 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; benzoates, such as phenyl salicylate, resorcinol monobenzoate, 2,4-di-tert-butylphenyl-3,5-di-tert-butyl-4-hydroxybenzoate, octyl (3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy) benzoate, octadecyl(3,5-di-tert-butyl-4-hydroxy)benzoate, and behenyl(3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; and a variety of metal salts and metal chelates, particularly salts and chelates of nickel and chromium. When an ultraviolet absorber is incorporated, the amount thereof is preferably 0.001 to 10 parts by mass, more preferably 0.01 to 0.5 parts by mass, with respect to 100 parts by mass of the olefin polymer.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)·di(tridecyl)-1,2,3,4-butanetetracarboxylate, bis(1,2,2,6,6-pentamethyl-4- piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]aminoundecane, bis{4-(1-octyloxy-2,2,6,6-tetramethyl)piperidyl}decanedionate, and bis{4-(2,2,6,6-tetramethyl-1-undecyloxy)piperidyl)carbonate. When a hindered amine compound is incorporated, the amount thereof is preferably 0.001 to 10 parts by mass, more preferably 0.01 to 0.5 parts by mass, with respect to 100 parts by mass of the olefin polymer.

Examples of the nucleating agent include sodium-2,2'-methylene-bis(4,6-di-tert-butylphenyl)phosphate; lithium-2,2'-methylene-bis(4,6-di-tert-butylphenyl)phosphate; aluminum hydroxy-bis[2,2'-methylene-bis(4,6-di-tert-butylphenyl)phosphate]; metal carboxylates, such as sodium benzoate, aluminum 4-tert-butylbenzoate, sodium adipate, and 2-sodium-bicyclo[2.2.1]heptane-2,3-dicarboxylate; polyol derivatives, such as dibenzylidene sorbitol, bis(methylbenzylidene)sorbitol, bis(3,4-dimethylbenzylidene)sorbitol, bis(p-ethylbenzylidene)sorbitol, and bis(dimethylbenzylidene)sorbitol; and amide compounds, such as N,N',N"-tris[2-methylcyclohexyl]-1,2,3-propane tricarboxamide, N,N',N'-tricyclohexyl-1,3,5-benzene tricarboxamide, N,N'-dicyclohexylnaphthalene dicarboxamide, and 1,3,5-tri(dimethylisopropoylamino)benzene. When a nucleating agent is incorporated, the amount thereof is preferably 0.001 to 10 parts by mass, more preferably 0.006 to 0.5 parts by mass, with respect to 100 parts by mass of the olefin polymer.

Examples of the flame retardant include aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, "ADK STAB FP-500", "ADK STAB FP-600" and "ADK STAB FP-800" (trade names, manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthrene-10-oxide derivatives; phosphazene compounds, such as bis(2-allylphenoxy) phosphazene and dicresylphosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-di-bromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or hydrotalcite. When a flame retardant is incorporated, the amount thereof is preferably 1 to 100 parts by mass, more preferably 10 to 70 parts by mass, with respect to 100 parts by mass of the olefin polymer.

The lubricant is added for the purposes of imparting the surface of the resulting molded article with lubricity and improving the damage-preventing effect. Examples of the lubricant include unsaturated fatty acid amides, such as oleic acid amide and erucic acid amide; saturated fatty acid amides, such as behenic acid amide and stearic acid amide; butyl stearate; stearyl alcohols; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be used individually, or two or more thereof may be used in combination. When a lubricant is incorporated, the amount thereof is preferably 0.01 to 2 parts by mass, more preferably 0.03 to 0.5 parts by mass, with respect to 100 parts by mass of the olefin polymer.

The hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s), specifically hydrotalcites represented by Formula (4) below in which a metal is substituted with an alkali metal. In addition, as an Al—Li hydrotalcite, a compound represented by Formula (5) below can be used as well.

$$Mg_{x1}Zn_{x2}Al_2(OH)_{2(x1+x2)-4}(CO_3)pH_2O \quad (4)$$

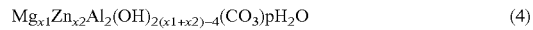

wherein, x1 and x2 each represent a number that satisfies the conditions represented by the following equations; and p represents 0 or a positive number:

$0 \le x2/x1 < 10$ and $2 \le (x1+x2) \le 20$.

$$[Li_{1/3}Al_{2/3}(OH)_2]\cdot[A^{1-}{}_{1/3q}\cdot pH_2O] \quad (5)$$

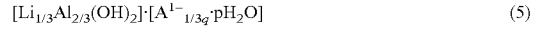

wherein, $A^{q-}$ represents an anion having a valence of q; and p represents 0 or a positive number.

Further, the carbonate anion in the hydrotalcites may be partially substituted with other anion.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcite may be a naturally-occurring or synthetic hydrotalcite. Examples of a synthesis method thereof include known methods that are described in JPS46-2280B, JPS50-30039B, JPS51-29129B1, JPH03-36839B2, JPS61-174270A, JPH05-179052A and the like. Further, the hydrotalcites can be used without any restriction in terms of crystal structure, crystal particles and the like. When a hydrotalcite is incorporated, the amount thereof is preferably 0.001 to 5 parts by mass, more preferably 0.01 to 3 parts by mass, with respect to 100 parts by mass of the olefin polymer.

Examples of the antistatic agent include cationic antistatic agents, such as fatty acid quaternary ammonium ion salts and polyamine quaternary salts; anionic antistatic agents, such as higher alcohol phosphates, higher alcohol EO adducts, polyethylene glycol fatty acid esters, anionic alkyl sulfonates, higher alcohol sulfates, higher alcohol ethylene oxide adduct sulfates, and higher alcohol ethylene oxide adduct phosphates; nonionic antistatic agents, such as polyhydric alcohol fatty acid esters, polyglycol phosphates, and polyoxyethylene alkyl allyl ethers; and amphoteric antistatic agents, such as amphoteric alkyl betaines (e.g., alkyldimethylamino acetic acid betaines) and imidazoline-type amphoteric activators. These antistatic agents may be used individually, or two or more thereof may be used in combination. When an antistatic agent is incorporated, the amount thereof is preferably 0.03 to 2 parts by mass, more preferably 0.1 to 0.8 parts by mass, with respect to 100 parts by mass of the olefin polymer.

As the pigment, a commercially available pigment can be used as well, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50.

The fluorescent brightener refers to a compound which enhances the whiteness or blueness of a molded article by a fluorescent action of absorbing ultraviolet rays of solar light and artificial light, converting the absorbed ultraviolet rays into visible light of purple to blue and radiating the visible light. Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostyrylbenzyl sulfone-based compounds.

When a fluorescent brightener is used, the amount thereof to be incorporated is preferably 0.00001 to 0.1 parts by mass, more preferably 0.00005 to 0.05 parts by mass, with respect to 100 parts by mass of the olefin polymer.

Examples of the dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be used in combination.

The olefin resin composition of the present invention contains an olefin polymer obtained by the production method of the present invention, and can be mixed with the above-described other additives.

For molding of the olefin resin composition of the present invention, any known molding method can be employed. A molded article can be obtained by, for example, injection molding, extrusion molding, blow molding, vacuum molding, inflation molding, calender molding, slush molding, dip molding, or foam molding.

Examples of the use of the olefin resin composition of the present invention include automobile materials, such as bumpers, dash boards, and instrument panels; housing applications, such as refrigerators, laundry machines, and vacuum cleaners; household articles, such as tableware, buckets, and bath goods; miscellaneous goods, such as toys; molded articles, including storage/preservation containers such as tanks; films; and fibers.

EXAMPLES

The present invention will now be described more concretely by way of Examples thereof. However, the present invention is not restricted to the following Examples and the like by any means.

Synthesis of Phosphite Compound 1

Production Example 1

To a flask, triphenyl phosphite (20 g, 0.065 mol), 4-tert-amylphenol (18 g, 0.11 mol), 2,4-di-tert-amylphenol (26 g, 0.11 mol) and 0.2 g of potassium carbonate were added. The flask was heated to 130° C. under a nitrogen atmosphere, and then slowly heated to 175° C. over a period of 5 hours. Subsequently, at this temperature, the pressure was slowly reduced to 1 kPa or less and maintained for 3 hours. Thereafter, the pressure was brought back to the atmospheric pressure and the flask was cooled to 35° C., after which the resulting product was recovered. The thus obtained product was confirmed to be a mixture of tris[(4-(1,1-dimethylpropyl)phenyl)]phosphite, [2,4-bis(1,1-dimethylpropyl)phenyl]bis[4-(1,1-dimethylpropyl)phenyl]phosphite and bis[2,4-bis(1,1-dimethylpropyl)phenyl][4-(1,1-dimethylpropyl)phenyl]phosphite (phosphite compound 1) using a nuclear magnetic resonance apparatus.

Production Example 2

(Synthesis of Phosphite Compound 2)

To a flask, polypropylene glycol (200 g, 0.5 mol), triphenyl phosphite (155 g, 0.5 mol), a mixture of lauryl alcohol and myristyl alcohol (200 g, 1.0 mol), and 0.8 g of potassium hydroxide were added. The flask was heated to 160° C. under a nitrogen atmosphere and maintained at this temperature for 1 hour. Subsequently, at this temperature, the pressure was slowly reduced to 1 kPa or less, and the flask was slowly heated to 170° C. over a period of 1 hour and maintained at this temperature for 2 hours. Thereafter, the pressure was brought back to the atmospheric pressure and the flask was cooled to 35° C., after which the resulting product was recovered. The thus obtained product was confirmed to be a compound having a structure corresponding to Formula (3) (phosphite compound 2) using a nuclear magnetic resonance apparatus and gel permeation chromatography.

(Preparation of Phenolic Antioxidant Solution)

In a flask placed in a glove box under a nitrogen atmosphere, 0.55 g of Compound 1, 35.0 ml of hexane and 1.6 ml of a triethyl aluminum 1-mol/L heptane solution were added to prepare a homogeneous solution having a Compound 1 concentration of 15 mg/ml.

Compound 1: stearyl-3-(3,5-di-tert-butyl-4-hydroxyphenyl)propionic acid amide (Preparation of Phosphite Compound Solution)

In a flask placed in a glove box under a nitrogen atmosphere, 1.8 g of one of Compounds 2, 3 and 4 and 40.0 ml of hexane were added to prepare a homogeneous solution having a phosphite-based antioxidant concentration of 45 mg/ml.

Compound 2: phosphite compound 1
Compound 3: phosphite compound 2
Comparative Compound: tris(2,4-di-tert-butylphenyl)phosphite Examples 1 to 5

To an autoclave whose atmosphere had been replaced with nitrogen, 600 mL of heptane, 303 mg of triethyl aluminum, 0.26 mmol of dicyclopentyldimethoxysilane and a Ziegler catalyst were added along with the above-obtained phenolic antioxidant and phosphite compound solution in the amounts shown in Table 1 with respect to 100 parts by mass of the resulting polymer, followed by stirring. The atmosphere inside the autoclave was replaced with propylene, and pre-polymerization was performed at 50° C. for 5 minutes under a propylene pressure of 1 kgf/cm$^2$G. After purging propylene, 340 ml of hydrogen (23° C.) was blown into the autoclave, and the temperature was raised to 70° C. to perform a polymerization reaction at 70° C. for 1 hour under a propylene pressure of 6 kgf/cm$^2$G in the autoclave. Thereafter, the atmosphere in the system was replaced with nitrogen gas, and the polymerization reaction was quenched by adding 5 ml of ethanol at 40° C., after which the solvent was removed under reduced pressure at 50° C., and the resulting polymer was subsequently dried in vacuum at 40° C. for 5 hours to obtain a polypropylene polymer. The thus obtained polypropylene polymers all had a polymerization activity of 8.0 kg per 1 g of the catalyst.

Comparative Examples 1 to 4

To an autoclave whose atmosphere had been replaced with nitrogen, 600 mL of heptane, 303 mg of triethyl aluminum, 0.26 mmol of dicyclopentyldimethoxysilane and a Ziegler catalyst were added, followed by stirring. The atmosphere inside the autoclave was replaced with propylene, and pre-polymerization was performed at 50° C. for 5 minutes under a propylene pressure of 1 kgf/cm$^2$G. After purging propylene, 340 ml of hydrogen (23° C.) was blown into the autoclave, and the temperature was raised to 70° C. to perform a polymerization reaction at 70° C. for 1 hour under a propylene pressure of 6 kgf/cm$^2$G in the autoclave. Thereafter, the atmosphere in the system was replaced with nitrogen gas, and the polymerization reaction was quenched by adding 5 ml of ethanol at 40° C., after which the solvent was removed under reduced pressure at 50° C., and the resulting polymer was subsequently dried in vacuum at 40° C. for 5 hours to obtain a polypropylene polymer. The thus obtained polypropylene polymers all had a polymerization activity of 8.0 kg per 1 g of the catalyst.

Example 6

To an autoclave whose atmosphere had been replaced with nitrogen, 600 mL of heptane, 340 mg of triethyl aluminum and a Ziegler catalyst were added along with the above-obtained phenolic antioxidant and phosphite compound solution in the amounts shown in Table 1 with respect to 100 parts by mass of the resulting polymer, followed by stirring. The atmosphere inside the autoclave was replaced with ethylene, and the temperature was raised to 70° C. to perform pre-polymerization for 1 minute under a hydrogen pressure of 2.3 kgf/cm$^2$G and an ethylene pressure of 6 kgf/cm$^2$G. Thereafter, the atmosphere in the system was replaced with nitrogen gas, and the polymerization reaction was quenched by adding 5 ml of ethanol at 40° C., after which the solvent was removed under reduced pressure at 50° C., and the resulting polymer was subsequently dried in vacuum at 40° C. for 5 hours to obtain a polyethylene polymer. The thus obtained polyethylene polymer had a polymerization activity of 6.0 kg per 1 g of the catalyst.

(Evaluation of Stabilization Effect)

The additives shown in Table 1 below were added in the amounts shown in Table 1 with respect to 100 parts by mass of each polypropylene polymer or polyethylene polymer obtained above. The resulting mixture was loaded to a uniaxial extruder (apparatus: LABO-PLASTOMILL μ, manufactured by Toyo Seiki Seisaku-sho, Ltd.), and a cycle of extruding the mixture at a melt temperature of 230° C. and loading a pelletized product back to the uniaxial extruder was repeated five times. The weight-average molecular weight was measured for the polymer before the extrusion and the pellet after three extrusion operations and five extrusion operations, and the stabilization effect was evaluated. The weight-average molecular weight was measured by gel permeation chromatography (apparatus: VISCOTEK 350HT-GPC manufactured by Malvern Panalytical Ltd., measurement temperature: 145° C., solvent: o-dichlorobenzene, concentration: 3 mg/ml; columns: TSKgel GMHHR-H×2 and TSKgel G2000HHR×1, all of which were manufactured by Tosoh Corporation). The results thereof are shown in Table 1 below.

TABLE 1

| | Antioxidants added during polymerization | | Additives added during granulation | | Number of granulation operations and weight-average molecular weight of polymer: Mw × 10$^3$ | | |
|---|---|---|---|---|---|---|---|
| | Compound | Amount [parts by mass] | Compound | Amount [parts by mass] | Immediately after polymerization | Three times | Five times |
| Example 1 | Compound 1 | 0.005 | Ca-St | 0.05 | 326 | 306 | 290 |
| | Compound 2 | 0.015 | | | | | |
| Example 2 | Compound 1 | 0.005 | Ca-St | 0.05 | 324 | 307 | 289 |
| | Compound 3 | 0.015 | | | | | |
| Example 3 | Compound 1 | 0.005 | Ca-St | 0.05 | 324 | 303 | 284 |
| | Compound 3 | 0.01 | | | | | |

TABLE 1-continued

| | Antioxidants added during polymerization | | Additives added during granulation | | Number of granulation operations and weight-average molecular weight of polymer: Mw × 10³ | | |
|---|---|---|---|---|---|---|---|
| | Compound | Amount [parts by mass] | Compound | Amount [parts by mass] | Immediately after polymerization | Three times | Five times |
| Example 4 | Compound 1 Compound 3 | 0.005 0.02 | Ca-St | 0.05 | 326 | 308 | 292 |
| Example 5 | Compound 1 Compound 3 | 0.03 0.09 | Ca-St | 0.05 | 325 | 311 | 299 |
| Comp. Example 1 | — | — | Compound 1 Compound 2 Ca-St | 0.005 0.015 0.05 | 323 | 282 | 238 |
| Comp. Example 2 | — | — | Compound 1 Compound 3 Ca-St | 0.005 0.015 0.05 | 323 | 280 | 242 |
| Comp. Example 3 | — | — | Compound 1 Compound 3 Ca-St | 0.005 0.01 0.05 | 323 | 274 | 223 |
| Comp. Example 4 | — | — | Compound 1 Compound 3 Ca-St | 0.005 0.02 0.05 | 323 | 286 | 243 |
| Example 6 | Compound 1 Compound 3 | 0.005 0.01 | Ca-St | 0.05 | 440 | 428 | 418 |

Ca-St: calcium stearate

From comparisons between Comparative Examples 1 to 4 and Examples 1 to 4 shown in Table 1, it was confirmed that the olefin resin compositions obtained by the production method of the present invention have excellent thermal stabilization effect against heat history of granulation. In addition, according to Example 5, the thermal stabilization effect was further improved by increasing the amount of the antioxidants, and an olefin resin composition was obtained with no problem. Moreover, from Example 6, it was confirmed that the polyethylene also exhibited excellent stabilization effect against the heat history of granulation.

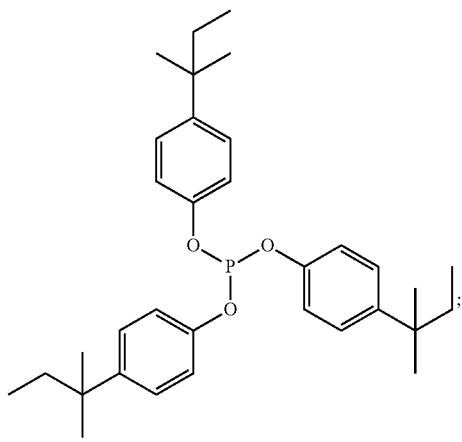

(2-1)

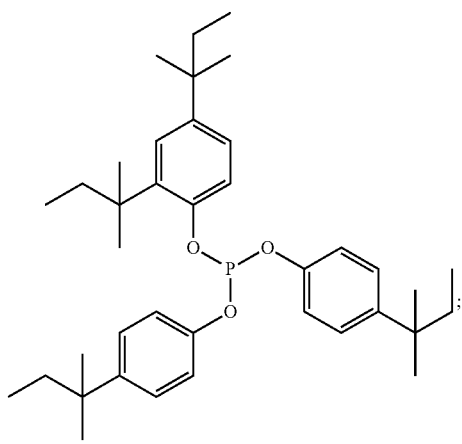

(2-2)

The invention claimed is:

1. A method of producing an olefin resin composition that comprises:
   polymerizing an olefin monomer to produce a polyolefin resin in the presence of a mixture; and
   wherein the mixture is added to a catalyst system or a polymerization system before or during the polymerization of the olefin monomer;
   wherein said mixture comprises:
     stearyl-3-(3,5-di-tert-butyl-4-hydroxyphenyl)propionic acid amide as a phenolic antioxidant;
     a mixture of phosphite compounds represented by the following Formulae (2-1), (2-2) and (2-3), or a phosphite compound represented by the following Formula (3); and
     an organoaluminum compound or a mixed solvent of an organoaluminum compound and an organic solvent:

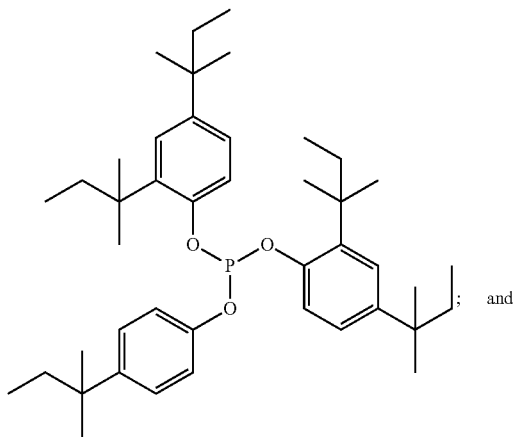

(2-3)

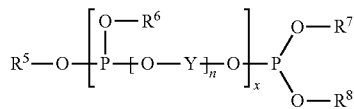

(3)

wherein $R^5$, $R^6$, $R^7$ and $R^8$ each independently represent an alkyl group having 12 to 14 carbon atoms; Y represents propylene group; n represents an integer of 2 to 100; and x represents an integer of 1 to 1,000; wherein 0.005 to 0.03 parts by mass of stearyl-3-(3,5-di-tert-butyl-4-hydroxyphenyl)propionic acid amide and 0.01 to 0.09 parts by mass of the mixture of the phosphite compounds represented by Formulae (2-1), (2-2) and (2-3) or the phosphite compound represented by Formula (3) are incorporated with respect to 100 parts by mass of the polyolefin resin obtained by the polymerization.

2. The method of producing an olefin resin composition according to claim 1, wherein the olefin monomer comprises ethylene or propylene.

3. The method of producing an olefin resin composition according to claim 1, wherein the organoaluminum compound is a trialkyl aluminum.

4. An olefin polymer obtained by the method according to claim 1.

5. An olefin resin composition comprising the olefin polymer according to claim 4.

6. A molded article obtained by molding the olefin resin composition according to claim 5.

7. The method of producing an olefin resin composition according to claim 2, wherein the organoaluminum compound is a trialkyl aluminum.

8. An olefin polymer obtained by the method according to claim 2.

9. An olefin polymer obtained by the method according to claim 3.

* * * * *